(12) United States Patent
Ku et al.

(10) Patent No.: US 9,548,490 B2
(45) Date of Patent: Jan. 17, 2017

(54) ANODE ACTIVE MATERIAL, LITHIUM BATTERY COMPRISING THE SAME, AND METHOD OF PREPARING THE ANODE ACTIVE MATERIAL

(71) Applicant: Samsung Electronics Co., Ltd., Suwon-si, Gyeonggi-do (KR)

(72) Inventors: Junhwan Ku, Seongnam-si (KR); Seungsik Hwang, Seongnam-si (KR); Jonghwan Park, Yongin-si (KR); Inhyuk Son, Yongin-si (KR); Jeongkuk Shon, Hwaseong-si (KR); Jaemyung Lee, Seoul (KR); Yeonji Chung, Yongin-si (KR); Jaeman Choi, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 294 days.

(21) Appl. No.: 14/493,443

(22) Filed: Sep. 23, 2014

(65) Prior Publication Data

US 2015/0243969 A1 Aug. 27, 2015

(30) Foreign Application Priority Data

Feb. 26, 2014 (KR) ........................ 10-2014-0022879

(51) Int. Cl.
*H01M 4/36* (2006.01)
*H01M 4/38* (2006.01)
*H01M 4/04* (2006.01)
*H01M 4/1393* (2010.01)
*H01M 4/1395* (2010.01)
*H01M 4/583* (2010.01)
(Continued)

(52) U.S. Cl.
CPC .......... *H01M 4/366* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/386* (2013.01); *H01M 4/483* (2013.01); *H01M 4/583* (2013.01); *H01M 4/587* (2013.01); *H01M 10/052* (2013.01); *Y02E 60/122* (2013.01)

(58) Field of Classification Search
CPC ...... H01M 4/366; H01M 4/583; H01M 4/386; H01M 4/48; H01M 4/1393; H01M 4/1395; H01M 4/0471; H01M 10/0525
USPC ........................................ 429/231.5
See application file for complete search history.

(56) References Cited

U.S. PATENT DOCUMENTS 7,939,218 B2 5/2011 Niu
9,331,338 B2 5/2016 Hwang et al.
(Continued)

FOREIGN PATENT DOCUMENTS

JP 4768562 B2 6/2011
KR 10-0728783 B1 6/2007
(Continued)

*Primary Examiner* — Karie O'Neill Apicella
(74) *Attorney, Agent, or Firm* — Cantor Colburn LLP

(57) ABSTRACT

An anode active material includes: a core including a metal or a metalloid that can incorporate and deincorporate lithium ions; and a plurality of coating layers on a surface of the core, each coating layer including a metal oxide, an amorphous carbonaceous material, or combination thereof. Also, a lithium battery including the anode active material, and a method of preparing the anode active material.

20 Claims, 10 Drawing Sheets

(51) Int. Cl.
*H01M 4/48* (2010.01)
*H01M 10/0525* (2010.01)
*H01M 4/133* (2010.01)
*H01M 4/134* (2010.01)
*H01M 4/587* (2010.01)
*H01M 10/052* (2010.01)

(56) References Cited

U.S. PATENT DOCUMENTS

| | | |
|---|---|---|
| 2008/0187838 A1 | 8/2008 | Le |
| 2011/0183169 A1 | 7/2011 | Bhardwaj et al. |
| 2013/0040201 A1 | 2/2013 | Manthiram et al. |
| 2013/0083496 A1 | 4/2013 | Franklin et al. |
| 2013/0108907 A1 | 5/2013 | Bhardwaj et al. |
| 2014/0050983 A1* | 2/2014 | Kim ............... H01M 4/133 429/213 |
| 2014/0170467 A1 | 6/2014 | Kwon et al. |
| 2015/0140450 A1 | 5/2015 | Roy et al. |

FOREIGN PATENT DOCUMENTS

| | | |
|---|---|---|
| KR | 10-1035361 B1 | 5/2011 |
| KR | 10-1065248 B1 | 9/2011 |
| KR | 10-1084077 B1 | 11/2011 |
| KR | 10-1126202 B1 | 3/2012 |
| KR | 1020140035689 A | 3/2014 |
| KR | 1020140061955 A | 5/2014 |
| KR | 1020140077622 A | 6/2014 |
| KR | 1020150058999 A | 5/2015 |

\* cited by examiner

ANODE ACTIVE MATERIAL, LITHIUM BATTERY COMPRISING THE SAME, AND METHOD OF PREPARING THE ANODE ACTIVE MATERIAL

CROSS-REFERENCE TO RELATED APPLICATIONS

This application claims the benefit of Korean Patent Application No. 10-2014-0022879, filed on Feb. 26, 2014, in the Korean Intellectual Property Office, and all the benefits accruing therefrom under 35 U.S.C. §119, the content of which is incorporated herein by reference.

BACKGROUND

1. Field

The present disclosure relates to an anode active material, a lithium battery including the anode active material, and a method of preparing the anode active material, and more particularly, an anode active material having improved charge-discharge rate characteristics and improved lifetime characteristics, a lithium battery including the anode active material, and a method of preparing the anode active material.

2. Description of the Related Art

Lithium batteries, and in particular, lithium ion batteries ("LIB" s) have been used as power sources for various portable devices due to their high energy density and ease of design. With recent use of LIBs as power sources for electric vehicles or power storages, and for portable information technology ("IT") devices, there has been increasing research into materials for lithium ion batteries having high energy density and long lifetime.

In particular, regarding high-capacity anode active materials, anode active materials using silicon or silicon alloys have drawn attention as high-capacity anode active materials. However, anode active materials using silicon or silicon alloys may undergo significant volume change during charge and discharge of a lithium battery. This may cause the surface of silicon in the anode active material to be continuously exposed to an electrolyte in the lithium battery, and consequently lead to capacity loss in the lithium battery. Furthermore, such anode active materials using silicon or silicon alloys may have low electrical conductivity, and thus may result in lower performing lithium batteries.

Therefore, there still is a need for an anode active material having improved charge and discharge rate characteristics and improved lifetime characteristics, a lithium battery including the anode active material, and a method of preparing the anode active material.

SUMMARY

Provided are anode active materials having improved charge-discharge rate characteristics and improved lifetime characteristics.

Provided are lithium batteries including the anode active materials.

Provided are methods of preparing the anode active materials having improved charge-discharge rate characteristics and improved lifetime characteristics.

Additional aspects will be set forth in part in the description which follows and, in part, will be apparent from the description, or may be learned by practice of the presented embodiments.

According to an aspect, an anode active material includes: a core including a metal or a metalloid that can incorporate and deincorporate lithium ions; and a plurality of coating layers on a surface of the core, each coating layer including a metal oxide, an amorphous carbonaceous material, or a combination thereof.

According to another aspect, a lithium battery includes: a cathode; an electrolyte; and an anode, wherein the anode includes the anode active material.

According to another aspect, a method of preparing an anode active material includes: contacting a core including a metal or a metalloid that can incorporate and deincorporate lithium ions and a first metal oxide precursor, a first carbon precursor, or a combination thereof to prepare a first mixture; thermally treating the first mixture in an inert atmosphere to form a first coating layer on a surface of the core, the first coating layer including a first metal oxide derived from the first metal oxide precursor, a first amorphous carbonaceous material derived from the first carbon precursor, or a combination thereof; contacting the core including the first coating layer with a second metal oxide precursor, a second carbon precursor, or a combination thereof to form a second mixture, wherein the first metal oxide precursor and the second metal oxide precursor are the same or different and wherein the first carbon precursor and the second carbon precursor are the same or different; and thermally treating the second mixture to form a second coating layer on the first coating layer, the second coating layer including a second metal oxide derived from the second metal oxide precursor, a second amorphous carbonaceous material derived from the second carbon precursor, or combination thereof, wherein the first metal oxide and the second metal oxide are the same or different and wherein the first amorphous carbonaceous material and the second amorphous carbonaceous material are the same or different, to prepare the anode active material.

Also disclosed is a method of preparing an anode active material, the method including: contacting a core including a metal or a metalloid that can incorporate and deincorporate lithium ions and a metal oxide precursor or a carbon precursor to prepare a first mixture; thermally treating the first mixture in an inert atmosphere to form a core including a first coating layer on a surface of the core, the first coating layer including a metal oxide derived from the metal oxide precursor or an amorphous carbonaceous material derived from the carbon precursor; then contacting the core including the first coating layer with the other of the metal oxide precursor and the carbon precursor to form a second mixture; and thermally treating the second mixture to form a second coating layer on the first coating layer, the second coating layer including a metal oxide derived from the metal oxide precursor or an amorphous carbonaceous material derived from the carbon precursor, to prepare the anode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
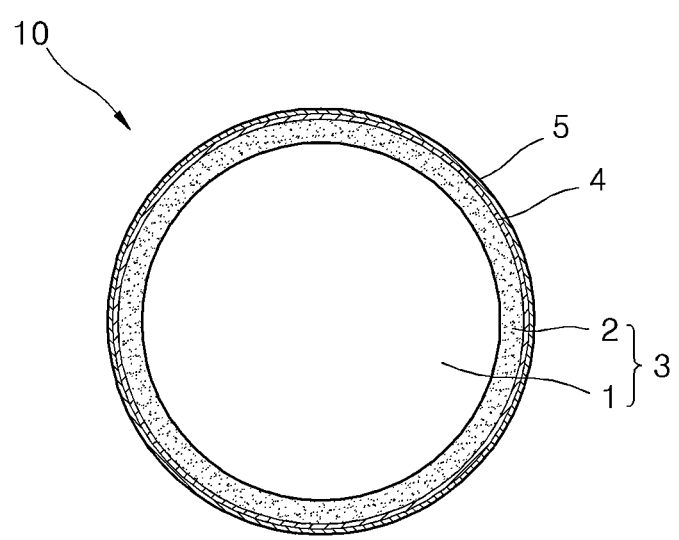
FIG. 1 is a schematic diagram of an embodiment of an anode active material.

Reference will now be made in detail to embodiments of anode active materials, lithium batteries including the anode active materials, and methods of preparing the anode active materials, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a straight or branched chain, saturated, monovalent hydrocarbon group (e.g., methyl or hexyl).

"Alkenyl" means a straight or branched chain, monovalent hydrocarbon group having at least one carbon-carbon double bond (e.g., ethenyl (—HC=CH2)).

"Alkynyl" means a straight or branched chain, monovalent hydrocarbon group having at least one carbon-carbon triple bond (e.g., ethynyl).

"Arylalkyl" means a substituted or unsubstituted aryl group covalently linked to an alkyl group that is linked to a compound (e.g., a benzyl is a C7 arylalkyl group).

The prefix "hetero" means that the compound or group includes at least one a heteroatom (e.g., 1, 2, or 3 heteroatom(s)), wherein the heteroatom(s) is each independently N, O, S, Si, or P.

According to an embodiment, an anode active material comprises: a core comprising a metal or a metalloid that can incorporate and deincorporate, e.g., intercalate and deintercalate or alloy and dealloy lithium ions; and a plurality of coating layers on a surface of the core, each coating layer comprising a metal oxide, an amorphous carbonaceous material, or combination thereof.

Nonlimiting examples of the metal or metalloid that can that can incorporate and deincorporate lithium ions include lithium, aluminum, lead, tin, germanium, silicon, an alloy thereof, or a combination thereof, for example, a lithium-aluminum, lithium-lead, lithium-tin, lithium-germanium, or a lithium-silicon alloy, or a combination thereof. However, when these metals, metalloids are used alone as an anode active material, precipitation of dendritic lithium, or a sudden volumetric change may occur. Alternatively, a composite of the metals or metalloids can be used with a carbonaceous material to increase an electric capacity and prevent a short circuit in a lithium battery.

However, when such a composite of these metals, metalloids, or alloys thereof with a carbonaceous material is used as an anode active material, it may lower an initial efficiency and an energy density of a lithium battery if the amount of the amorphous carbonaceous material is high. To uniformly coat the carbonaceous material on a surface of such a metal, metalloid, or alloy thereof, atomic layer deposition could be used. However, methods such as atomic layer deposition are costly and difficult.

While not wanting to be bound by theory, it is understood that the anode active material that includes a core including a metal or a metalloid that can incorporate and deincorporate lithium ions, and a plurality of coating layers on a surface of the core, each of which comprises a metal oxide, an amorphous carbonaceous material, or combination thereof, according to an embodiment, may improve the diffusion rate of lithium ions and may suppress a side reaction with an electrolyte which may occur on the surface of the anode active material, thereby improving lifetime characteristics of a lithium battery.

The expression "a plurality of coating layers" as used herein means that the anode active material has a structure including at least two coating layers. For example, the anode active material may include two coating layers on a surface of the core, wherein one of the two coating layers includes a metal oxide and the other coating layer includes an amorphous carbonaceous material, or may include a plurality of coating layers including metal oxides and a plurality of coating layers including amorphous carbonaceous materials. The order of the coating layers disposed on the surface of the core is not limited, and in an embodiment a coating layer does not include both a metal oxide and an amorphous carbonaceous material.

When an anode active material comprising a coating layer including both a metal oxide and an amorphous carbonaceous material is disposed on a surface of a core of the anode active material, and while not wanting to be bound by theory, it is understood that the metal oxide and the amorphous carbonaceous material may be segregated from one another on the surface of the core, and thus suitable control of cracks, which may result from a volumetric change of the core during charge or discharge, may not be provided. However, the disclosed anode active material may include coating layers including a metal oxide and an amorphous carbonaceous material, respectively, on the surface of the core. As a result, the anode active material may entirely or effectively absorb a volumetric expansion of the core during charge and discharge of the anode active material in a lithium battery to effectively or entirely suppress cracking and persistent exposure of an interface of the core to an electrolyte, thus improving lifetime characteristics.

In some embodiments, the core of the anode active material may include silicon, a silicon alloy, a composite comprising silicon and a crystalline carbonaceous material, or a combination thereof. For example, the core of the anode active material may be a composite comprising silicon and a crystalline carbonaceous material, i.e., a silicon/crystalline carbonaceous material composite.

The composite comprising silicon and a crystalline carbonaceous material may have a structure in which silicon is disposed on a surface of the crystalline carbonaceous material. In this regard, the expression "disposed" as used herein may also refer to the state in which the silicon is deposited or grown on the surface of the crystalline carbonaceous material.

The silicon of the silicon/crystalline carbonaceous material composite may be selected from a silicon particle, a silicon nanowire, a silicon nanorod, a silicon nanotube, a silicon nanoribbon, or a combination thereof. For example, the silicon of the silicon/crystalline carbonaceous material composite may be a silicon nanowire. For example, the silicon particle may have an average particle diameter of about 100 nanometers (nm) or less. For example, the silicon nanowire may have an average diameter of about 20 nm to about 100 nm, or about 30 nm to about 80 nm, and an average length of about 1 μm to about 100 μm, or about 2 μm to about 80 μm, or about 4 μm to about 60 μm. For example, the silicon nanorod may have an average particle diameter similar to that of the silicon nanowire, and an aspect ratio smaller than that of the silicon nanowire. For example, the silicon nanotube may have an average particle diameter of about 500 nm, or about 50 nm to about 1000 nm, or about 100 nm to about 800 nm. For example, the silicon nanoribbon may have a width of about 100 nm and an aspect ratio of about 10 or greater, such as a width of about 10 nm to about 200 nm, and an aspect ratio of about 2 to about 100, or a width of about 20 nm to about 150 nm, and an aspect ratio of about 4 to about 50.

The crystalline carbonaceous material of the silicon/crystalline carbonaceous material composite may comprise natural graphite, artificial graphite, or a combination thereof. The crystalline carbonaceous material of the silicon/crystalline carbonaceous material composite may include a pore or may be non-porous. The crystalline carbonaceous material of the silicon/crystalline carbonaceous material composite may include primary particles, or secondary particles of agglomerated primary particles.

The silicon/crystalline carbonaceous material composite may provide improved capacity when included in a lithium battery, and, while not wanting to be bound by theory, may provide an electrically conductive path in an anode material to improve electrical conductivity of the lithium battery.

An amount of the metal or metalloid in the core may be in a range of about 1 part by weight to about 50 parts by weight, based on 100 parts by weight of a total weight of the anode active material. For example, the amount of the metal or metalloid in the core may be in a range of about 1 part by weight to about 40 parts by weight, or about 2 parts by weight to about 30 parts by weight based on 100 parts by weight of the total weight of the anode active material.

In some embodiments, the metal oxide in the anode active material may include a metal oxide represented by Formula 1:

$$M_xO_y \qquad \text{Formula 1}$$

wherein, in Formula 1, M may be aluminum (Al), magnesium (Mg), silicon (Si), zirconium (Zr), vanadium (V), molybdenum (Mo), or a combination thereof; $0<x<5$; and $0<y<20$.

In Formula 1, M may be, for example, Al or Zr, and $1<x<4$; and $1<y<10$. Since M in the metal oxide of Formula 1 is stable with low reactivity with lithium, the anode active material including the metal oxide-including coating layer on the surface of the core may provide improved structural stability.

An amount of the metal oxide may be in a range of about 0.5 parts by weight to less than about 2 parts by weight, or about 0.7 parts by weight to about 1.8 parts by weight, or about 0.9 parts by weight to less than about 1.6 parts by weight, based on 100 parts by weight of the total weight of the anode active material. When the amount of the metal oxide is within this range, the metal oxide-including coating layer may minimize resistance of the core surface to migration of charges, and thus may improve charge and discharge rate characteristics and lifetime characteristics of the anode active material in a lithium battery.

Figure 5A:
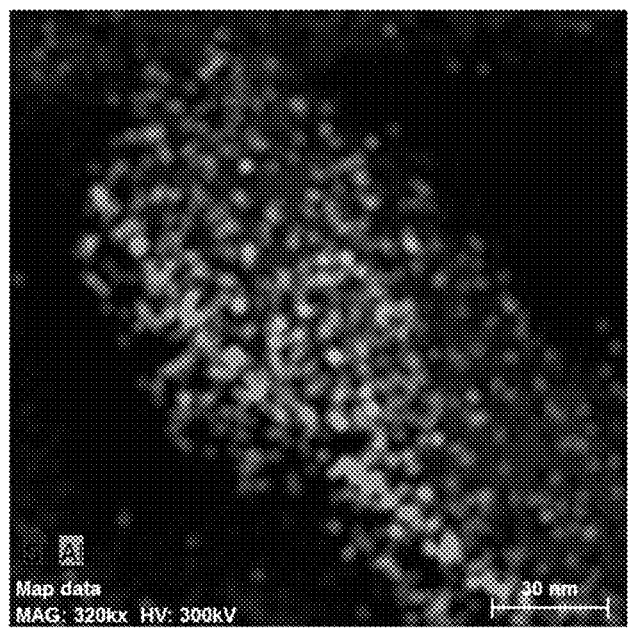
FIG. 5A is a transmission electron microscopic ("TEM") image of an $Al_2O_3$ coating layer on a surface of the anode active material of Example 1.

The metal oxide-including coating layer may have a thickness of about 10 nm or less, for example, about 0.1 nm to about 10 nm, or about 0.5 nm to about 8 nm, or about 1 nm to about 6 nm. The thickness of the metal oxide-including coating layer may be identified from a transmission electron microscopic ("TEM") image, as shown in FIG. 5A, for example. When the thickness of the metal oxide-including coating layer is within these ranges, the anode active material including the metal oxide-including coating layer may relieve a volumetric change of the core during charge and discharge to maintain high capacity of the anode active material in lithium battery. The thickness of the metal oxide-including coating layer may be uniform over the entire surface of the core, but is not limited thereto. For example, the thickness of the metal oxide-including coating layer may have a variation including scattering on the surface of the core, and/or the metal oxide-including coating layer may be formed only on part of the core surface. Any embodiment may provide the effects described above.

The amorphous carbonaceous material may comprise soft carbon, hard carbon, meso-phase pitch carbides, sintered corks, or a combination thereof. In some embodiments, the anode active material including such an amorphous carbonaceous material may further improve charge and discharge rate characteristics and lifetime characteristics of a lithium battery, since the amorphous carbonaceous material-including coating layer may not cause a reaction with an electrolyte to suppress decomposition of the electrolyte.

An amount of the amorphous carbonaceous material may be in a range of about 0.1 parts by weight to less than about 2 parts by weight, about 0.2 parts by weight to less than about 1.8 parts by weight, or about 0.4 parts by weight to less than about 1.6 parts by weight, based on 100 parts by weight of the total weight of the anode active material. When the thickness of the amorphous carbonaceous material-including coating layer is within this range, the amorphous carbonaceous material-including coating layer may minimize resistance of the core surface to migration of charges, and thus may improve charge and discharge rate characteristics and lifetime characteristics of the anode active material in a lithium battery.

Figure 5B:
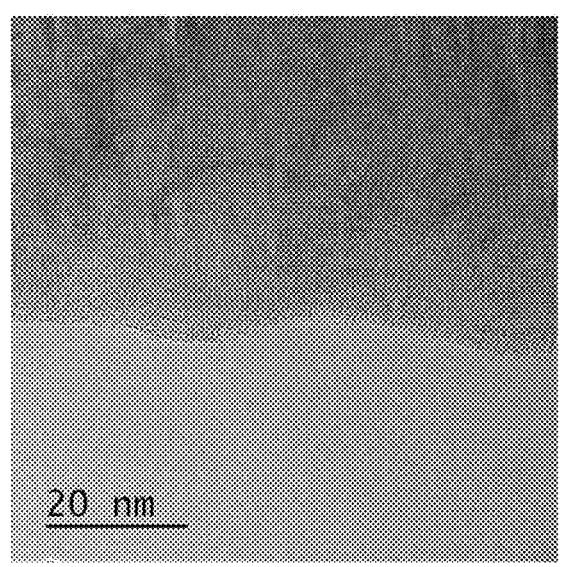
FIG. 5B is a TEM image of an amorphous carbonaceous coating layer on the surface of the anode active material of Example 1.

The amorphous carbonaceous material-including coating layer may have a thickness of about 10 nm or less, for example, about 0.1 nm to about 10 nm, or about 0.2 nm to about 8 nm, or about 0.4 nm to about 6 nm. The thickness of the amorphous carbonaceous material-including coating layer may be identified from a TEM image, as shown in FIG. 5B, for example. The thickness of the amorphous carbonaceous material-including coating layer may be uniform over the entire surface of the core, but is not limited thereto. For example, the thickness of the amorphous carbonaceous material-including coating layer may have a variation including scattering on the surface of the core, and/or the amorphous carbonaceous material-including coating layer may be formed only on part of the metal oxide-including coating layer. Any embodiment may provide the effects described above.

In some embodiments, the anode active material may include a silicon/crystalline carbonaceous material composite core with silicon disposed on the crystalline carbonaceous material, a metal oxide coating layer disposed on the silicon surface of the silicon/crystalline carbonaceous material composite core, and an amorphous carbonaceous material coating layer disposed on each of the silicon surface of the silicon/crystalline carbonaceous material composite core and the metal oxide coating layer. The presence of the metal oxide coating layer and the amorphous carbonaceous material coating layer may each be identified by X-ray photoelectron spectroscopic ("XPS") analysis, as is further disclosed below.

FIG. 1 is a schematic diagram of an embodiment of an anode active material 10. Referring to FIG. 1, the anode active material 10 includes a core 3, e.g., a silicon/crystalline carbonaceous material composite core, with silicon 2 disposed on a surface of a crystalline carbonaceous material particle 1. The anode active material 10 also includes a metal oxide coating layer 4, e.g., an $Al_2CO_3$ coating layer, and an amorphous carbonaceous material coating layer 5 on a surface of the core 3, e.g., the silicon/crystalline carbonaceous material composite core.

In XPS spectra of the anode active material, an Al 2p peak may appear at a binding energy of about 75 eV or less. The anode active material may have improved electric conductivity, and thus may improve charge and discharge rate characteristics of a lithium battery including the anode active material.

In some embodiments, the anode active material may be a composite further including a crystalline carbonaceous material. An amount of the crystalline carbonaceous material may be in a range of about 0.1 parts by weight to 30 parts by weight, or about 1 parts by weight to 25 parts by weight, or about 5 parts by weight to 20 parts by weight, based on 100 parts by weight of the total weight of the anode active material. When the amount of the crystalline carbonaceous material is within this range, the anode active material may have further improved electric conductivity.

According to another embodiment, a lithium battery includes a cathode, an electrolyte, and an anode, wherein the anode comprises the anode active. In an embodiment, the anode may consist of the anode active material, and in an embodiment the anode active material may consist of the core and the plurality of coating layers. An example of manufacturing the lithium battery is as follows:

First of all, the anode may be manufactured as follows:

An anode active material, a binding agent, and a solvent may be combined to prepare an anode active material composition. A conducting agent may be further added to the anode active material composition if desired. The anode active material composition may then be directly coated on a copper current collector and dried to manufacture the anode with an anode active material film. In some embodiments, the anode active material composition may be cast on a separate support to form an anode active material film, which may then be separated from the support and laminated on a copper current collector to manufacture an anode with the anode active material film.

The anode active material may include a core including a metal or a metalloid that can incorporate and deincorporate, e.g., intercalate and deintercalate lithium ions, and a plurality of coating layers on a surface of the core, each coating layer including a metal oxide, an amorphous carbonaceous material, or combination thereof. In the anode active material, the core, the types, amounts, and compositions of the metal oxide and the amorphous carbonaceous material, and thicknesses of the coating layers may be the same as those described above, and thus further detailed descriptions thereof will be omitted here for clarity.

Non-limiting examples of the binding agent are polyacrylate ("PAA"), lithium polyacrylate ("LiPAA"), a vinylidene fluoride/hexafluoropropylene copolymer, a polyvinylidene fluoride, a polyacrylonitrile, a polymethylmethacrylate, a polytetrafluoroethylene ("PTFE"), and a styrene butadiene rubber-based polymer.

Non-limiting examples of the solvent are N-methyl-pyrrolidone ("NMP"), acetone, water, or a combination thereof. Any suitable material available as a solvent in the art may be used.

Non-limiting examples of the conducting agent are carbon black, graphite particulates, natural graphite, artificial graphite, acetylene black, ketjen black, carbon fibers, metallic materials, such as copper, nickel, aluminum, silver, and the like, in powder, fiber, or tube form, or a conductive polymer such polyphenylene or a derivative thereof, or a combination thereof. Any suitable conducting agent available in the art may be used. The amount of the cathode active material, the conducting agent, the binding agent, and the solvent of the anode may be as is used in the manufacture of lithium batteries in the art, the details of which can be determined by one of skill in the art without undue experimentation.

In some embodiments, the anode may further include a second anode active material, in addition to the anode active material as listed above. Any suitable additional anode active material available in the art may be used, provided that it can incorporate and deincorporate lithium ions.

The cathode may be manufactured in the same manner as the manufacture of the anode, except that a cathode active material instead of the anode active material is used.

An example of manufacturing the cathode is as follows:

Similar to the manufacture of the anode, a cathode active material, a binding agent, and a solvent, and optionally, a conducting agent may be combined to prepare a cathode active material composition. The cathode active material composition may be directly coated on an aluminum current collector to manufacture a cathode. In some embodiments, the cathode active material composition may be cast on a separate support to form a cathode active material film, which may then be separated from the support and laminated on an aluminum current collector to manufacture a cathode.

The cathode active material is not specifically limited, and may be any suitable cathode active material used in the art. For example, a compound that allows reversible intercalation and deintercalation of lithium ions may be used. For example, a composite oxide of cobalt, manganese, nickel, or a combination thereof with lithium may be used. For example, the cathode active material may comprise a compound represented by $Li_aA_{1-b}M_bD_2$ (where $0.90 \leq a \leq 1.8$, and $0 \leq b \leq 0.5$); $Li_aE_{1-b}M_bO_{2-c}D_c$ (where $0.90 \leq a \leq 1.8$, $0 \leq b \leq 0.5$, and $0 \leq c \leq 0.05$); $LiE_{2-b}M_bO_{4-c}D_c$ (where $0 \leq b \leq 0.5$, and $0 \leq c \leq 0.05$); $Li_aNi_{1-b-c}Co_bM_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bM_cO_{2-\alpha}X_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bM_cO_{2-\alpha}X_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bM_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bM_cO_{2-\alpha}X_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bM_cO_{2-\alpha}X_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiM''O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulas above, A is nickel (Ni), cobalt (Co), manganese (Mn), or a combination thereof; M is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; X is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; M'' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

Non-limiting examples of the cathode active materials are $LiMn_2O_4$, $LiNi_2O_4$, $LiCoO_2$, $LiNiO_2$, $LiMnO_2$, $Li_2MnO_3$, $LiFePO_4$, and $LiNi_xCo_yO_2$ (where $0 < x \leq 0.15$ and $0 < y \leq 0.85$). For example, the cathode active material may be $Li_{1+x}M'_{1-x}O_2$, where $0.05 \leq x \leq 0.2$, and M' may be a transition metal. Non-limiting examples of the transition metal M' are nickel (Ni), cobalt (Co), manganese (Mn), iron (Fe), and titanium (Ti).

The conducting agent, the binder, and the solvent used in the cathode active material composition may be the same as those used in the anode active material composition. If desired, a plasticizer may be added to each of the cathode active material composition and the anode active material composition to form pores in the electrode plates.

The amounts of the cathode active material, the conducting agent, the binder, and the solvent used in the manufacture of the lithium battery may be as is used in the art, the details of which can be determined by one of skill in the art without undue experimentation. At least one of the conducting agent, the binder, and the solvent may be omitted depending on the use and the structure of a lithium battery.

Next, a separator to be disposed between the cathode and the anode may be prepared. The separator for the lithium battery may be any suitable separator that is used in lithium batteries. The separator may have low resistance to migration of ions in an electrolyte and have an excellent electrolyte-retaining ability. Examples of the separator include glass fiber, polyester, Teflon, polyethylene, polypropylene, polytetrafluoroethylene ("PTFE"), or a combination thereof, each of which may be a non-woven or woven fabric. For example, a rollable separator including polyethylene or polypropylene may be used for a lithium ion battery. A separator with good organic electrolyte solution retaining capability may be used for a lithium ion polymer battery. For example, the separator may be manufactured in the following manner.

A polymer resin, a filler, and a solvent may be combined to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any suitable material that is used as a binder for electrode plates. Non-limiting examples of the polymer resin include a vinylidenefluoride/hexafluoropropylene copolymer, polyvinylidene fluoride ("PVDF"), polyacrylonitrile, polymethylmethacrylate, or a combination thereof.

Next, an electrolyte is prepared.

For example, the electrolyte may be an organic electrolyte solution. Alternately, the electrolyte may be in a solid phase. Non-limiting examples of the electrolyte include boron oxide and lithium oxynitride. Any suitable material available as a solid electrolyte in the art may be used. The solid electrolyte may be formed on the anode by, for example, sputtering.

In some embodiments, an organic electrolyte solution may be prepared as follows: The organic electrolyte solution may be prepared by dissolving a lithium salt in an organic solvent.

The organic solvent may be any suitable solvent available as an organic solvent in the art. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof.

The lithium salt may be any suitable material available as a lithium salt in the art. For example, the lithium salt may be, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a combination thereof.

Figure 2:
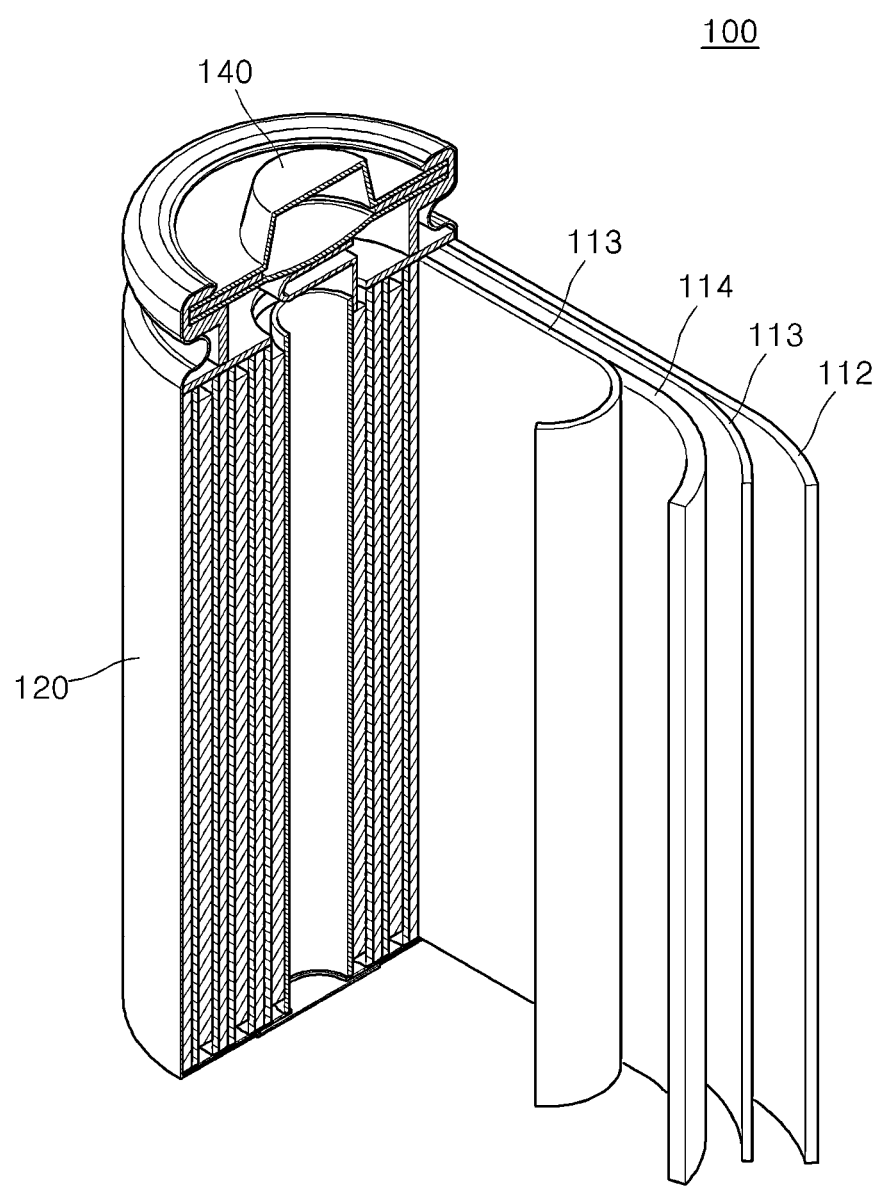
FIG. 2 is an exploded perspective view of an embodiment of a lithium battery.

Referring to FIG. 2, a lithium battery 100 according to an embodiment may include a cathode 114, a separator 113, and an anode 112. The cathode 114, the separator 113, and the anode 113 are wound or folded, and then accommodated in a battery case 120. Subsequently, an organic electrolyte is disposed into the battery case 120, and the battery case 25 is then sealed by a sealing member 140, thereby completing the manufacture of the lithium battery 100. The battery case 120 may be a cylindrical type, a rectangular type, or a thin-film type. For example, the lithium battery 100 may be a large-size thin film battery. The lithium battery 100 may be a lithium ion battery.

The separator may be interposed between the cathode and the anode to form a battery assembly. Alternatively, the battery assembly may be stacked in a bi-cell structure and impregnated with the electrolyte solution. The resultant is put into a pouch and hermetically sealed, thereby completing the manufacture of a lithium ion polymer battery.

Alternatively, a plurality of battery assemblies may be stacked to form a battery pack, which may be used in a device that operates at high temperatures and high output, for example, as in a laptop computer, a smart phone, an electric vehicle, or the like.

According to another embodiment, a method of preparing any of the anode active material comprises: combining a core including a metal or a metalloid that can incorporate and deincorporate lithium ions, a metal oxide precursor, and a carbon precursor to prepare a mixture; and thermally treating the mixture several times in an inert atmosphere to form a plurality of coating layers on a surface of the core, each coating layer including a metal oxide, an amorphous carbonaceous material, or combination thereof, to prepare the anode active material.

In an embodiment, a method of preparing an anode active material comprises: contacting a core comprising a metal or a metalloid that can incorporate and deincorporate lithium ions and a first metal oxide precursor, a first carbon precursor, or a combination thereof to prepare a first mixture; thermally treating the first mixture in an inert atmosphere to form a first coating layer on a surface of the core, the first coating layer comprising a first metal oxide derived from the first metal oxide precursor, a first amorphous carbonaceous material derived from the first carbon precursor, or a combination thereof; contacting the core comprising the first coating layer with a second metal oxide precursor, a second carbon precursor, or a combination thereof to form a second mixture, wherein the first metal oxide and the second metal oxide are the same or different and wherein the first carbon precursor and the second carbon precursor are the same or different; and thermally treating the second mixture to form a second coating layer on the first coating layer, the second coating layer comprising a second metal oxide derived from the second metal oxide precursor, a second amorphous carbonaceous material derived from the carbon precursor, or combination thereof, wherein the first metal oxide and the second metal oxide are the same or different and wherein the first amorphous carbonaceous material and the second amorphous carbonaceous material are the same or different, to prepare the anode active material.

In another embodiment, a method of preparing an anode active material comprises contacting a core comprising a metal or a metalloid that can incorporate and deincorporate lithium ions and a metal oxide precursor or a carbon precursor to prepare a first mixture; thermally treating the first mixture in an inert atmosphere to form a core comprising a first coating layer on a surface of the core, the first coating layer comprising a metal oxide derived from the metal oxide precursor or an amorphous carbonaceous material derived from the carbon precursor; then contacting the core comprising the first coating layer with the other of the metal oxide precursor and the carbon precursor to form a second mixture; and thermally treating the second mixture to form a second coating layer on the first coating layer, the second coating layer comprising a metal oxide derived from the metal oxide precursor or an amorphous carbonaceous material derived from the carbon precursor, to prepare the anode active material.

First, the metal or metalloid that can incorporate and deincorporate lithium ions may be prepared. The core may be a silicon/crystalline carbonaceous material composite. The silicon/crystalline carbonaceous material composite may have a structure in which silicon is disposed on a surface of a crystalline carbonaceous material. For example, the silicon/crystalline carbonaceous material composite may have a structure in which a silicon nanowire is disposed on the surface of the crystalline carbonaceous material. A type and amount of the silicon and the crystalline carbonaceous material in the core may be the same as those described above, and thus further detailed description thereof will be omitted here.

In some embodiments, the silicon/crystalline carbonaceous material composite core may be prepared by impregnating a crystalline carbonaceous material with a catalyst, and thermally treating the impregnated crystalline carbonaceous material after supplying a silicon precursor to grow a silicon nanowire from a surface of the crystalline carbonaceous material. For example, the catalyst may comprise Au, Cu, Al, Ag, or Ni. The silicon precursor may comprise $SiH_4$ or $SiCl_4$, but is not limited thereof. Any suitable silicon precursor used in chemical vapor deposition ("CVD") may be used. For example, the thermal treatment for growing the silicon nanowire may be performed at a temperature of about 400° C. to about 500° C., for example, for about 1 minute to about 10 hours.

Next, a metal oxide precursor and a carbon precursor may be added to the silicon/crystalline carbonaceous material composite core to prepare a mixture. In the preparing of the mixture, the metal oxide precursor and the carbon precursor may be sequentially or simultaneously added to the silicon/crystalline carbonaceous material composite core.

For example, the metal oxide precursor may include $AlCl_3$, $MgCl_2$, $SiCl_4$, $ZrCl_4$, $VCl_4$, $MoCl_2$, or a combination thereof.

In some embodiments, the carbon precursor may be a substituted or unsubstituted $C_6$-$C_{30}$ aromatic compound; or a substituted or unsubstituted $C_5$-$C_{30}$ heterocyclic compound that has a hydroxyl group, a carboxyl group, or a combination thereof; or a combination of the $C_6$-$C_{30}$ aromatic compound and the $C_5$-$C_{30}$ heterocyclic compound. For example, the carbon precursor may be a substituted or unsubstituted benzene, a substituted or unsubstituted pentalene, a substituted or unsubstituted indene, a substituted or unsubstituted naphthalene, a substituted or unsubstituted azulene, a substituted or unsubstituted heptalene, a substituted or unsubstituted indacene, a substituted or unsubstituted acenaphthalene, a substituted or unsubstituted fluorene, a substituted or unsubstituted phenalene, a substituted or unsubstituted phenanthrene, a substituted or unsubstituted anthracene, a substituted or unsubstituted fluoranthene, a substituted or unsubstituted triphenylene, a substituted or unsubstituted pyrene, a substituted or unsubstituted chrysene, a substituted or unsubstituted naphthacene, a substituted or unsubstituted picene, a substituted or unsubstituted perylene, a substituted or unsubstituted pentaphene, a substituted or unsubstituted hexacene, a substituted or unsubstituted pyrrole, a substituted or unsubstituted pyrazole, a substituted or unsubstituted imidazole, a substituted or unsubstituted imidazoline, a substituted or unsubstituted imidazopyridine, a substituted or unsubstituted imidazopyrimidine, a substituted or unsubstituted pyridine, a substituted or unsubstituted pyrazine, a substituted or unsubstituted pyrimidine, a substituted or unsubstituted pyridazine, a substituted or unsubstituted indole, a substituted or unsubstituted purine, a substituted or unsubstituted quinoline, a substituted or unsubstituted phthalazine, a substituted or unsubstituted naphthyridin, a substituted or unsubstituted quinazoline, a substituted or unsubstituted cinnoline, a substituted or unsubstituted indazole, a substituted or unsubstituted carbazole, a substituted or unsubstituted phenazine, a substituted or unsubstituted phenanthridine, a substituted or unsubstituted triazine, a substituted or unsubstituted phenanthroline, or a substituted or unsubstituted quinoxaline. For example, the carbon precursor may be a substituted or unsubstituted benzene, a substituted or unsubstituted naphthalene, a substituted or unsubstituted phenalene, a substituted or unsubstituted phenanthrene, a substituted or unsubstituted anthracene, a substituted or unsubstituted triphenylene, a substituted or unsubstituted pyrene, a substituted or unsubstituted chrysene, a substituted or unsubstituted naphthacene, a substituted or unsubstituted picene, a substituted or unsubstituted perylene, a substituted or unsubstituted pentaphene, a substituted or unsubstituted hexacene, a substituted or unsubstituted pyridine, a substituted or unsubstituted pyrazine, a substituted or unsubstituted pyrimidine, a substituted or unsubstituted pyridazine, a substituted or unsubstituted quinoline, a substituted or unsubstituted phthalazine, a substituted or unsubstituted quinoxaline, a substituted or unsubstituted quinazoline, a substituted or unsubstituted cinnoline, a substituted or unsubstituted phenanthridine, a substituted or unsubstituted phenanthroline, or a substituted or unsubstituted phenazine, or a combination thereof.

The term "substituted" refers to substitution with a halogen atom, a C1-C20 alkyl group substituted with a halogen atom (for example, $CCF_3$, $CHCF_2$, $CH_2F$, $CCl_3$, or the like), a hydroxyl group, a nitro group, a cyano group, an amino group, an amidino group, a hydrazine, a hydrazone, a carboxylic acid group or a salt thereof, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C1-C20 heteroarylalkyl group.

In the preparing of the mixture, a solvent that may not chemically react with the core and the carbon precursor and that may be removed at a relatively low temperature, and that may serve as a medium that may effectively contact the core and the carbon precursor, may be used. Non-limiting examples of the solvent are acetone, ethanol, water, or a combination thereof.

Next, the mixture may be thermally treated several times in an inert atmosphere to form a plurality of coating layers on a surface of the core, each coating layer including a metal oxide, an amorphous carbonaceous material, or combination thereof. The forming of the plurality of coating layers may include thermally treating the mixture several times in an inert atmosphere including a nitrogen gas or an argon gas. When the thermal treatment is performed in such an inert atmosphere to form the coating layers including a metal oxide and an amorphous carbonaceous material on the surface of the core, loss of the metal oxide and the carbon precursor may be minimized.

In the forming of the plurality of coating layers, the thermal treatment for forming the coating layers including the metal oxide may be performed at a temperature of about 600° C. to about 900° C., for example, for about 1 hour to about 4 hours.

In the forming of the plurality of coating layers, the thermal treatment for forming the coating layers including amorphous carbonaceous material may include first thermal treatment at a temperature of about 250° C. to about 350° C., and second thermal treatment at a temperature of about 600° C. to 900° C. For example, the first thermal treatment and the second thermal treatment may each independently be performed for about 1 hour to about 4 hours. The first thermal treatment may cause a dehydration reaction between the hydroxyl group on the core surface and the hydroxyl group or carboxyl group of the carbon precursor to form a chemical bond between the core surface and the carbon precursor. The second thermal treatment in a relatively lower temperature range may form the amorphous carbonaceous material coating layer on the core surface, nearly not affecting on the structure of the core.

One or more embodiments will now be disclosed in further detail with reference to the following examples. However, these examples are not intended to limit the scope of the disclosed embodiments. Technical descriptions that can be determined by one of ordinary skill in the art without undue experimentation will be omitted herein.

EXAMPLES

Preparation of Anode Active Materials

Example 1

Preparation of Anode Active Material

A $Si_x/C_{(1-x)}$ (where 0<x<2) (SiNANOde®, Nanosys. Inc.) composite core was prepared. An amount of Si in the composite core was about 16 parts by weight based on 100 parts by weight of a total weight of a target anode active material, and an average particle diameter of Si was about 100 nm or less.

Next, about 1.0 part by weight of $AlCl_3$ as a metal oxide precursor was dissolved in 3000 parts by weight of ethanol, based on 100 parts by weight of the total weight of the anode active material, to prepare an $AlCl_3$ solution. The $Si_x/C_{(1-x)}$ (where 0<x<2) (SiNANOde®, Nanosys. Inc.) composite core was added to the $AlCl_3$ solution, stirred for about 5 minutes, evaporated at about 25° C. using a rotary evaporator to remove the ethanol, and then thermally treated in a nitrogen gas atmosphere at about 700° C. for about 2 hours to form an $Al_2O_3$ coating layer on the surface of the $Si_x/C_{(1-x)}$ (where 0<x<2) (SiNANOde®, Nanosys. Inc.) composite core.

Next, about 1.0 part by weight of 2,3-dihydroxynaphthalene as a carbon precursor was dissolved in 50 parts by weight of ethanol, based on 100 parts by weight of the total weight of the anode active material, to prepare a 2,3-dihydroxynaphthalene solution. The $Si_x/C_{(1-x)}$ (where 0<x<2) (SiNANOde®, Nanosys. Inc.) composite core with the $Al_2O_3$ coating layer was added to the 2,3-dihydroxynaphthalene solution and dried in a 80° C. oven, and thermally treated in a nitrogen gas atmosphere at about 300° C. for about 2 hours to remove $H_2O$, and further at about 700° C. for about 2 hours to form an amorphous carbonaceous material coating layer on the surfaces of the $Si_x/C_{(1-x)}$ (where 0<x<2) (SiNANOde®, Nanosys. Inc.) composite core and the $Al_2O_3$ coating layer, thereby preparing the target anode active material.

The $Al_2O_3$ coating layer formed on the surface of $Si_x/C_{(1-x)}$ (where 0<x<2) (SiNANOde®, Nanosys. Inc.) composite core of the anode active material had a thickness of about 1 nm or less, and the amorphous carbonaceous material coating layer formed on the surfaces of the $Si_x/C_{(1-x)}$ (where 0<x<2) (SiNANOde®, Nanosys. Inc.) composite core and the $Al_2O_3$ coating layer had a thickness of about 2 nm.

Example 2

Preparation of Anode Active Material

An anode active material was prepared in the same manner as in Example 1, except that about 1.0 part by weight of $AlCl_3$ as a metal oxide precursor and about 0.5 parts by weight of 2,3-dihydroxynaphthalene as a carbon precursor, each based on 100 parts by weight of a total weight of the anode active material, were used instead of about 1.0 part by weight of $AlCl_3$ and about 1.0 part by weight of 2,3-dihydroxynaphthalene, respectively.

An $Al_2O_3$ coating layer formed on the surface of a $Si_x/C_{(1-x)}$ (where 0<x<2) (SiNANOde®, Nanosys. Inc.) composite core of the anode active material had a thickness of about 1 nm or less, and an amorphous carbonaceous material coating layer formed on the surfaces of the $Si_x/C_{(1-x)}$ (where 0<x<2) (SiNANOde®, trademark by Nanosys. Inc.) composite core and the $Al_2O_3$ coating layer had a thickness of about 2 nm.

Example 3

Preparation of Anode Active Material

An anode active material was prepared in the same manner as in Example 1, except that about 0.5 parts by weight of $AlCl_3$ as a metal oxide precursor and about 0.5 parts by weight of 2,3-dihydroxynaphthalene as a carbon precursor, each based on 100 parts by weight of a total weight of the anode active material, were used instead of about 1.0 part by weight of $AlCl_3$ and about 1.0 part by weight of 2,3-dihydroxynaphthalene, respectively.

An $Al_2O_3$ coating layer formed on the surface of a $Si_x/C_{(1-x)}$ (where 0<x<2) (SiNANOde®, Nanosys. Inc.) composite core of the anode active material had a thickness of about 1 nm or less, and an amorphous carbonaceous material coating layer formed on the surfaces of the $Si_x/C_{(1-x)}$ (where 0<x<2) (SiNANOde®, Nanosys. Inc.) composite core and the $Al_2O_3$ coating layer had a thickness of about 2 nm.

Example 4

Preparation of Anode Active Material

An anode active material was prepared in the same manner as in Example 1, except that about 0.5 parts by weight of $AlCl_3$ as a metal oxide precursor and about 0.25 parts by weight of 2,3-dihydroxynaphthalene as a carbon precursor, each based on 100 parts by weight of a total weight of the anode active material, were used instead of about 1.0 part by weight of $AlCl_3$ and about 1.0 part by weight of 2,3-dihydroxynaphthalene, respectively.

An $Al_2O_3$ coating layer formed on the surface of a $Si_x/C_{(1-x)}$ (where 0<x<2) (SiNANOde®, Nanosys. Inc.) composite core of the anode active material had a thickness of about 1 nm or less, and an amorphous carbonaceous material coating layer formed on the surfaces of the $Si_x/C_{(1-x)}$ (where 0<x<2) (SiNANOde®, Nanosys. Inc.) composite core and the $Al_2O_3$ coating layer had a thickness of about 2 nm.

Comparative Example 1

Preparation of Anode Active Material

A $Si_x/C_{(1-x)}$ (where 0<x<2) (SiNANOde®, Nanosys. Inc.) composite core was prepared as an anode active material. An amount of Si in the composite core was about 16 parts by weight based on 100 parts by weight of a total weight of the anode active material, and an average particle diameter of Si was about 100 nm or less.

Comparative Example 2

Preparation of Anode Active Material

A $Si_x/C_{(1-x)}$ (where 0<x<2) (SiNANOde®, available from Nanosys. Inc.) composite core was prepared. An amount of Si in the composite core was about 16 parts by weight based on 100 parts by weight of a total weight of a target anode active material, and an average particle diameter of Si was about 100 nm or less.

Next, about 1.0 part by weight of $AlCl_3$ as a metal oxide precursor was dissolved in 3000 parts by weight of ethanol, based on 100 parts by weight of the total weight of the anode active material, to prepare an $AlCl_3$ solution. The $Si_x/C_{(1-x)}$ (where 0<x<2) (SiNANOde®, Nanosys. Inc.) composite core was added to the $AlCl_3$ solution, stirred for about 5 minutes, evaporated at about 25° C. using a rotary evaporator to remove the ethanol, and then thermally treated in a nitrogen gas atmosphere at about 700° C. for about 2 hours to form an $Al_2O_3$ coating layer on the surface of the $Si_x/C_{(1-x)}$ (where 0<x<2) (SiNANOde®, Nanosys. Inc.), thereby preparing the target anode active material.

An $Al_2O_3$ coating layer formed on the surface of the $Si_x/C_{(1-x)}$ (where 0<x<2) (SiNANOde®, Nanosys. Inc.) composite core of the anode active material had a thickness of about 1 nm or less.

Comparative Example 3

Preparation of Anode Active Material

A $Si_x/C_{(1-x)}$ (where 0<x<2) (SiNANOde®, available from Nanosys. Inc.) composite core was prepared. An amount of Si in the composite core was about 16 parts by weight based on 100 parts by weight of a total weight of a target anode active material, and an average particle diameter of Si was about 100 nm or less.

Next, about 0.5 parts by weight of 2,3-dihydroxynaphthalene as a carbon precursor was dissolved in 50 parts by weight of ethanol, based on 100 parts by weight of the total weight of the anode active material, to prepare a 2,3-dihydroxynaphthalene solution. The $Si_x/C_{(1-x)}$ (where 0<x<2) (SiNANOde®, Nanosys. Inc.) composite core was added to the 2,3-dihydroxynaphthalene solution and dried in a 80° C. oven, and thermally treated in a nitrogen gas atmosphere at about 300° C. for about 2 hours to remove $H_2O$, and further at about 700° C. for about 2 hours to form an amorphous carbonaceous material coating layer on the surface of the $Si_x/C_{(1-x)}$ (where 0<x<2) (SiNANOde®, Nanosys. Inc.) composite core, thereby preparing the target anode active material.

The amorphous carbonaceous material coating layer formed on the surface of the $Si_x/C_{(1-x)}$ (where 0<x<2) (SiNANOde®, Nanosys. Inc.) composite core of the anode active material had a thickness of about 2 nm.

Comparative Example 4

Preparation of Anode Active Material

An anode active material was prepared in the same manner as in Example 1, except that about 2.0 parts by weight of $AlCl_3$ as a metal oxide precursor and about 0.25 parts by weight of 2,3-dihydroxynaphthalene as a carbon precursor, each based on 100 parts by weight of a total weight of the anode active material, were used instead of about 1.0 part by weight of $AlCl_3$ and about 1.0 part by weight of 2,3-dihydroxynaphthalene, respectively.

An $Al_2O_3$ coating layer formed on the surface of the $Si_x/C_{(1-x)}$ (where 0<x<2) (SiNANOde®, Nanosys. Inc.) composite core of the anode active material had a thickness of about 1 nm or less, and an amorphous carbonaceous material coating layer formed on the surfaces of the $Si_x/C_{(1-x)}$ (where 0<x<2) (SiNANOde Nanosys. Inc.) composite core and the $Al_2O_3$ coating layer had a thickness of about 2 nm.

The anode active materials of Examples 1 to 4 and Comparative Examples 1 to 4 are summarized in Table 1:

TABLE 1

| Example | Number/Material of coating layers | Amount of $Al_2O_3$ (parts by weight based on 100 parts by weight of anode active material) | Amount of amorphous carbonaceous material (parts by weight based on 100 parts by weight of anode active material) |
|---|---|---|---|
| Example 1 | 2/$Al_2O_3$ + Amorphous carbonaceous material | 1.0 | 1.0 |
| Example 2 | 2/$Al_2O_3$ + Amorphous carbonaceous material | 1.0 | 0.5 |
| Example 3 | 2/$Al_2O_3$ + Amorphous carbonaceous material | 0.5 | 0.5 |
| Example 4 | 2/$Al_2O_3$ + Amorphous carbonaceous material | 0.5 | 0.25 |

TABLE 1-continued

| Example | Number/Material of coating layers | Amount of $Al_2O_3$ (parts by weight based on 100 parts by weight of anode active material) | Amount of amorphous carbonaceous material (parts by weight based on 100 parts by weight of anode active material) |
|---|---|---|---|
| Comparative Example 1 | 0/None | — | — |
| Comparative Example 2 | 1/$Al_2O_3$ | 1.0 | — |
| Comparative Example 3 | 1/Amorphous carbonaceous material | — | 0.5 |
| Comparative Example 4 | 2/$Al_2O_3$ + Amorphous carbonaceous material | 2.0 | 0.5 |

Manufacture of Lithium Batteries

Example 5

Manufacture of Coin Half-Cell

An aqueous solution of lithium polyacrylate ("LiPAA") as a binder was added to the anode active material powder of Example 1 in a ratio of 88:12 on solid content basis, and uniformly mixed together to prepare a slurry.

The slurry was coated on a Cu foil having a thickness of about 10 μm by bar coating to a thickness of about 50 μm to about 60 μm, and dried. Then, the resultant was further dried at about 120° C. in a vacuum to manufacture an anode plate. The anode plate was then roll-pressed to manufacture an anode in a sheet form for a coin cell. The anode had a capacity of about 3.0 milliampere-hours per square centimeter ($mAh/cm^2$) to about 3.5 $mAh/cm^2$.

A coin half-cell (CR2032 type) having a diameter of about 12 millimeters (mm) was manufactured using the anode, a lithium metal as a counter electrode, and an electrolyte including 1.1M $LiPF_6$ and 0.2M $LiBF_4$ lithium salts dissolved in a mixed solvent of ethylene carbonate ("EC"), diethyl carbonate ("DEC"), and fluoroethylene carbonate ("FEC") in a ratio of 2:6:2 by volume.

Examples 6 to 8

Manufacture of Coin Half-Cells

Coin half-cells (CR2032 type) were manufactured in the same manner as in Example 5, except that the anode active materials of Examples 2 to 4, instead of the anode active material of Example 1, were used, respectively.

Comparative Examples 5 to 8

Manufacture of Coin Half-Cells

Coin half-cells (CR2032 type) were manufactured in the same manner as in Example 5, except that the anode active materials of Comparative Examples 1 to 4, instead of the anode active material of Example 1, were used, respectively.

Surface Analysis of Anode Active Materials

Analysis Example 1

Thermogravimetric Analysis ("TGA")

Thermogravimetric analysis ("TGA") of the anode active materials of Examples 1 and 4 and Comparative Example 1 was performed using a TA SDT 2010 TGA/DSC1 (Simultaneous TGA-DSC, available from METTLER TOLEDO) in a temperature range of about 0° C. to about 800° C. The results are shown in FIG. 3.

Figure 3:
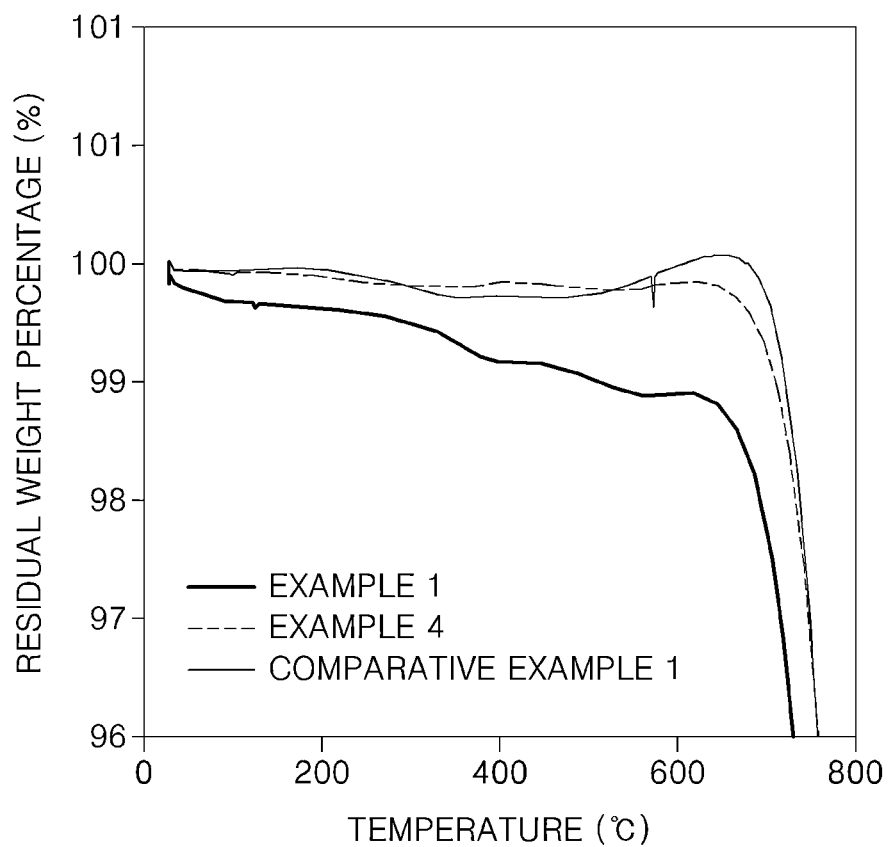
FIG. 3 is a graph of residual weight (percent, %) versus temperature (degrees centigrade, °C.) illustrating results of thermogravimetric analysis ("TGA") on the anode active materials of Examples 1 and 4 and Comparative Example 1.

Referring to FIG. 3, the amounts of the amorphous carbonaceous material in the anode active materials of Examples 1 and 4 and Comparative Example 1 were found to be about 1.0 part by weight, about 0.25 parts by weight, and 0 part by weight, respectively, based on 100 parts by weight of the anode active material.

In particular, weight loss of the amorphous carbonaceous materials in the anode active materials of Examples 1 and 4 and Comparative Example 1 occur upon carbonization at a temperature of about 600° C. or higher. Accordingly, the amounts of the amorphous carbonaceous materials in the anode active materials of Examples 1 and 4 and Comparative Example 1 were calculated from weight loss of each of the anode active materials, which was obtained via calculation of a residual weight, in percent, at a temperature of about 600° C. or higher and based on 100 parts by weight of the anode active material.

Analysis Example 2

Field-Emission Scanning Electron Microscopic ("FE-SEM") and Transmission Electron Microscopic ("TEM") Images Surfaces of the anode active materials of Example 1 and Comparative Example 1 were observed using an S-4700 FE-SEM system (Hitachi). The results are shown in FIGS. 4A and 4B.

Figure 4A:
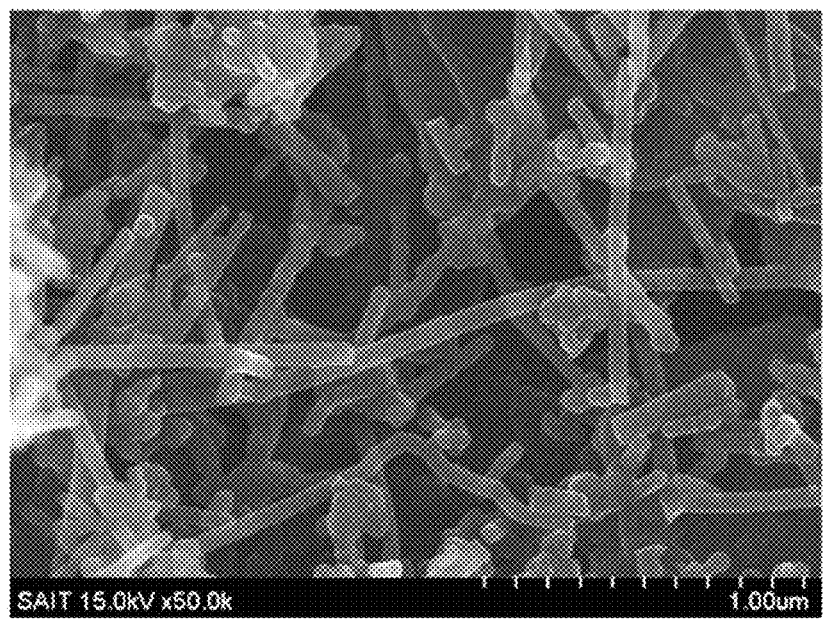
FIG. 4A is a field-emission scanning electron microscopic ("FE-SEM") image of the anode active material of Example 1.
Figure 4B:
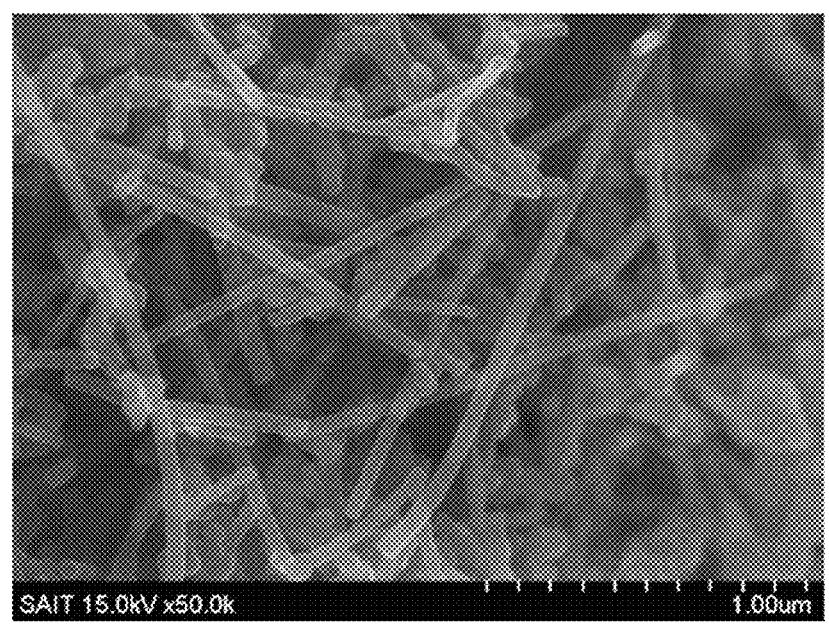
FIG. 4B is a FE-SEM image of an anode active material of Comparative Example 1.

Referring to FIGS. 4A and 4B, both in the anode active materials of Example 1 and Comparative Example 1, Si nanowires were found broken on the surfaces of the $Si_x/C_{(1-x)}$ (where 0<x<2) composite cores (available from Nanosys. Inc.), and the $Al_2O_3$ coating layer or/and the amorphous carbonaceous material coating layer were formed agglomerated on the surfaces of the $Si_x/C_{(1-x)}$ (where 0<x<2) composite cores (available from Nanosys. Inc.).

The $Al_2O_3$ coating layer and the amorphous carbonaceous material coating layer on the surface of the anode active material of Example 1 were observed using a G2 TEM system (available from Titan Inc.). The results are shown in FIGS. 5A and 5B.

Referring to FIGS. 5A and 5B, the $Al_2O_3$ coating layer and the amorphous carbonaceous material coating layer on the surface of the anode active material of Example 1 were found to have a thickness of about 1 nm or less and a thickness of about 2 nm, respectively.

Evaluation 3

X-Ray Photoelectron Spectroscopic ("XPS") Analysis

The entire surface of the anode active material of Example 1, and the silicon nanowires and the $Al_2O_3$ coating layers on the surface of the anode active material of Example 1 were analyzed by energy dispersive spectroscopy ("EDS") using a S-4700 EDS system (Hitachi). The results are shown in FIGS. 6A to 6C.

Figure 6A:
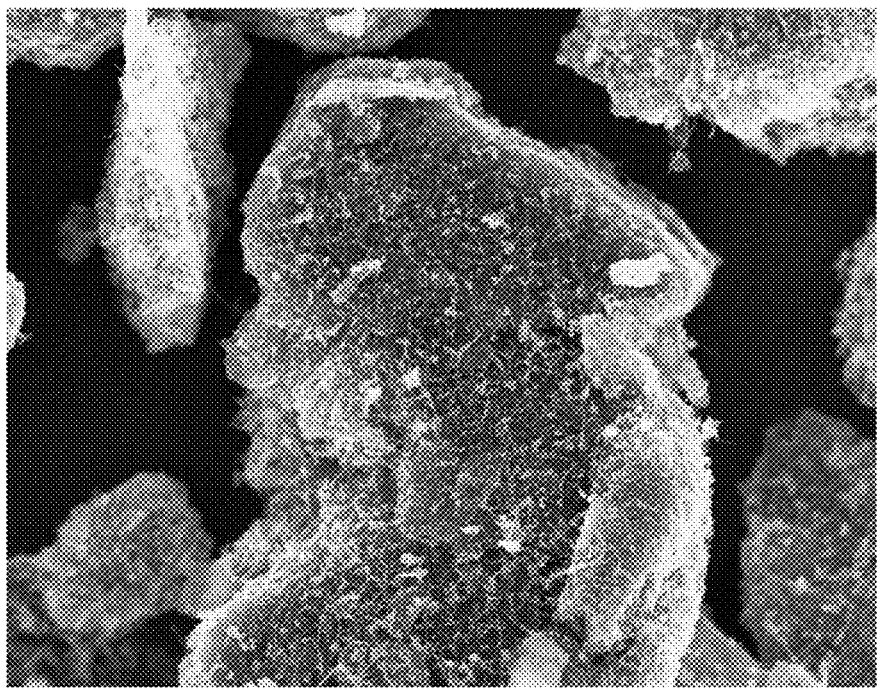
FIG. 6A is an image illustrating the results of energy dispersive spectroscopic ("EDS") analysis on the anode active material of Example 1.
Figure 6B:
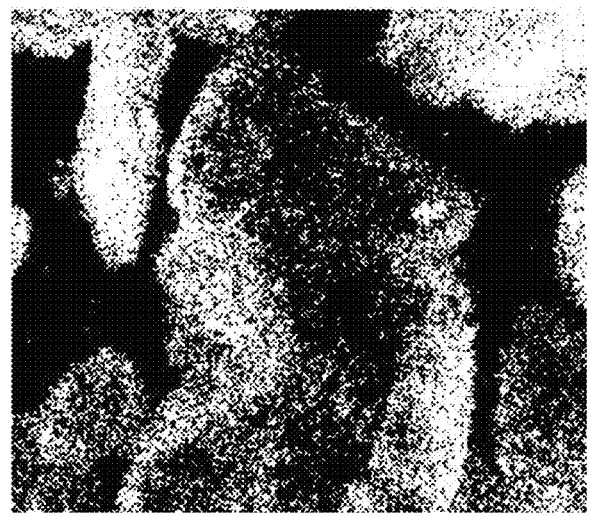
FIG. 6B is an image illustrating the results of EDS analysis on silicon nanowires in the anode active material of Example 1.
Figure 6C:
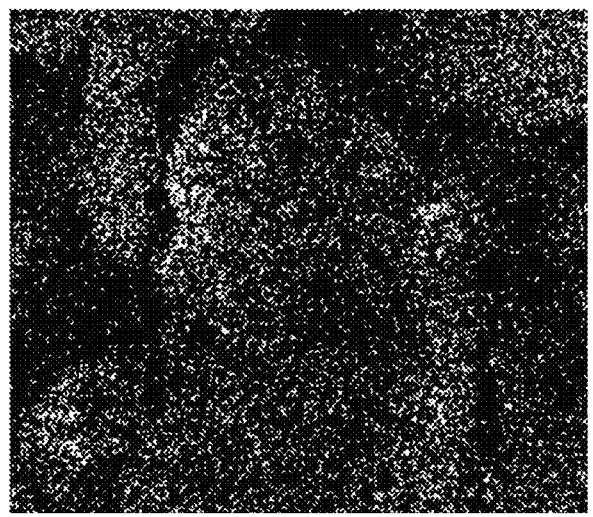
FIG. 6C is an image illustrating the results of EDS analysis on the $Al_2O_3$ coating layer in the anode active material of Example 1.

Referring to FIGS. 6A to 6C, as seen on the image of the entire surface of the anode active material of Example 1 in FIG. 6A, the positions of the silicon nanowires represented as dots in FIG. 6B were found to nearly match with those of the $Al_2O_3$ coating layers represented as dots in FIG. 6C, indicating that $Al_2O_3$ coating layers were uniformly formed on the surfaces of silicon, and in particular, silicon nanowires of the $Si_x/C_{(1-x)}$ (where $0<x<2$) composite core.

Analysis Example 4

X-Ray Photoelectron Spectroscopic ("XPS") Analysis

Figure 7A:
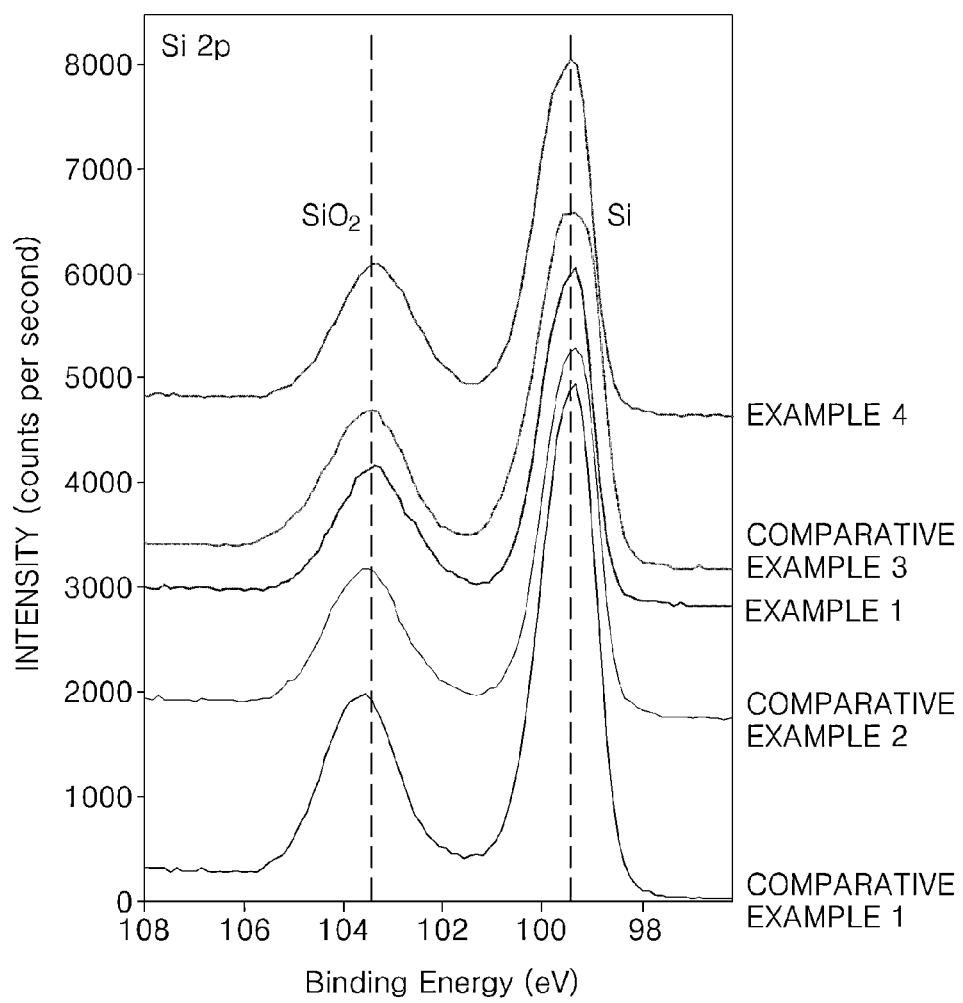
FIG. 7A is a graph of intensity (counts per second, c/s) versus binding energy (electron volts, eV), which shows the Si (2p) X-ray photoelectron spectroscopic ("XPS") spectra for the surfaces of anode active materials of Examples 1 and 4 and Comparative Examples 1 to 3.
Figure 7B:
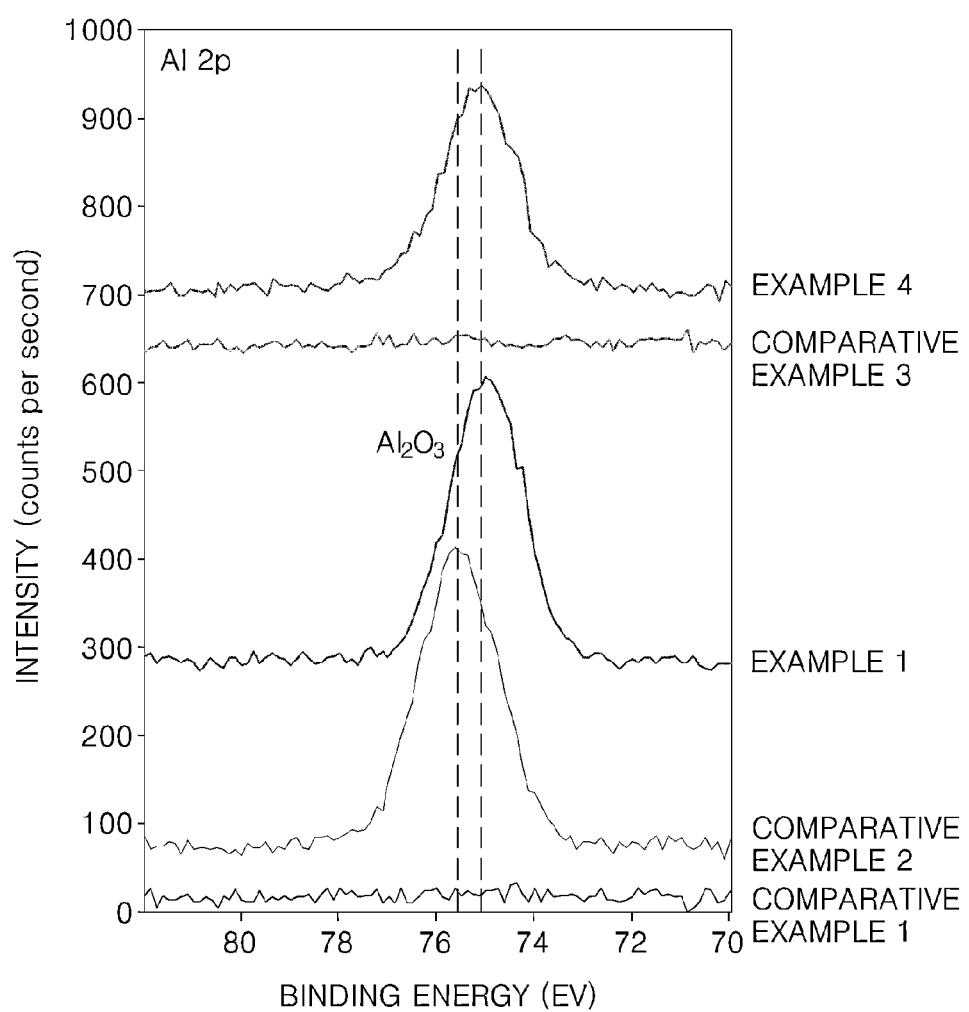
FIG. 7B is a graph of intensity (counts per second, c/s) versus binding energy (electron volts, eV), which shows the Al (2p) XPS spectra for the surfaces of the anode active materials of Examples 1 and 4 and Comparative Examples 1 to 3.

Each sample of the anode active materials of Examples 1 and 4 and Comparative Examples 1 to 3 was spread to fully cover a surface of a double-sided tape attached on a metal plate, pressed to be flat, and then mounted on an XPS holder for X-ray photoelectron spectroscopic ("XPS") analysis. The resulting Si 2p spectra and Al 2p spectra of the anode active materials of Examples 1 and 4 and Comparative Examples 1 to 3 are shown in FIGS. 7A and 7B, respectively. The results of quantitative elemental compositions analyses based on the XPS spectra of FIGS. 7A and 7B are shown in Table 2.

The XPS analysis was performed with a Quantum 2000 Scanning ESCA microprobe (Physical Electronics, Inc.) (having an accelerating voltage of 0.5~15 kiloelectron-volts (keV), 300 watts (W), an energy resolution of about 1.0 eV, a minimum analysis area of 10 micrometers, and a sputter rate of about 0.1 nm/min) with a monochromatic Al-Kα X-ray source (having an excitation energy of 1486.6 eV, 27.7 W, a measurement area of 0.1 mm², and a detector angle of about 45°).

Table 2 shows the amounts of carbon (C 1s), nitrogen (N 1s), oxygen (O 1s), aluminum (Al 2p), and silicon (Si 2p) by parts by weight based on 100 parts by weight of each of the anode active materials of Examples 1 and 4 and Comparative Examples 1 to 3.

TABLE 2

| Example | C 1s | N 1s | O 1s | Al 2p | Si 2p |
|---|---|---|---|---|---|
| Example 1 | 31.33 | 0 | 36.12 | 3.77 | 28.78 |
| Example 4 | 27.80 | 0.13 | 37.25 | 2.76 | 32.06 |
| Comparative Example 1 | 12.38 | 0 | 43.50 | 0 | 44.12 |
| Comparative Example 2 | 16.43 | 0 | 44.40 | 4.66 | 34.51 |
| Comparative Example 3 | 29.51 | 0.05 | 33.70 | 0 | 36.74 |

Referring to Table 2, in comparison of the anode active materials of Comparative Examples 1 and 2, the amount of silicon (Si 2p) in the anode active material of Comparative Example 2 was smaller than that of the anode active material of Comparative Example 1 by about 10 parts by weight, indicating that the $Al_2O_3$ coating layer in the anode active material of Comparative Example 2 was formed exclusively on the surface of silicon, and in particular, the surfaces of silicon nanowire of the $Si_x/C_{(1-x)}$ (where $0<x<2$) composite core.

In comparison of the anode active materials of Example 1 and Comparative Example 2, the amounts of silicon (Si 2p) and aluminum (Al 2p) in the anode active material of Example 1 were smaller than those of the anode material of Comparative Example 2 by about 6 parts by weight and about 0.9 parts by weight, respectively, indicating that the amorphous carbonaceous coating layer in the anode active material of Example 1 was formed both on the surface of silicon, and in particular, the surfaces of silicon nanowires, and the surface of the $Al_2O_3$ coating layer of the $Si_x/C_{(1-x)}$ (where $0<x<2$) composite core.

Referring to FIG. 7A, the anode active materials of Examples 1 and 4 and Comparative Examples 1 to 3 were found to exhibit Si peaks at a binding energy of about 99.5 eV and $SiO_2$ peaks at a binding energy of about 103.8 eV. The $SiO_2$ peaks detected from the anode active materials of Examples 1 and 4 and Comparative Examples 1 to 3 indicate the presence of $SiO_2$ as natural oxide layers on the silicon surfaces of the $Si_x/C_{(1-x)}$ (where $0<x<2$) composite cores.

Referring to FIG. 7B, the anode active materials of Examples 1 and 4 were found to exhibit Al 2p peaks at a binding energy of about 75 eV or less, which was lower than the binding energy at which an Al 2p peak of the anode active material of Comparative Example 2 appeared. This indicates that the anode active materials of Examples 1 and 4 may much easily emit electrons compared to the anode active material of Comparative Example 2 to have improved electron conductivity.

Evaluation of Battery Characteristics

Evaluation Example 1

Evaluation of Charge-Discharge Rate Characteristics

Charge-discharge rate characteristics of the coin half-cells of Examples 5 to 7 and Comparative Examples 5 to 7 were evaluated as follows:

Each of the coin half-cells of Examples 5 to 7 and Comparative Examples 5 to 7 was charged at room temperature at 0.1 C to 0.01 V and then discharged at a constant current of 0.1 C to a cut-off voltage of 1.5 V to measure charge and discharge capacities at $1^{st}$ cycle. An initial efficiency of each of the coin half-cells (as a ratio of discharge capacity to charge capacity at $1^{st}$ cycle) was calculated from the measured charge and discharge capacities. Each of the coin half-cells of Examples 5 to 7 and Comparative Examples 5 to 7 was charged/discharged at 0.5 C/0.1 C, 1.0 C/0.1 C, 2.0 C/0.1 C, and 5.0 C/1.0 C to evaluate rate characteristics. The results are shown in Table 3.

TABLE 3

|  | 1st cycle | | | Rate characteristics | | | |
|---|---|---|---|---|---|---|---|
| Example | (Charge capacity) mAh/g | (Discharge capacity mAh/g | Initial efficiency % | 0.5 C/ 0.1 C % | 1.0 C/ 0.1 C % | 2.0 C/ 0.1 C % | 5.0 C/ 0.1 C % |
| Example 5 | 889.2 | 751.2 | 84.5 | 91.4 | 89.1 | 84.4 | 72.7 |
| Example 6 | 865.7 | 753.6 | 87.0 | 93.3 | 90.2 | 86.6 | 74.8 |
| Example 7 | 865.8 | 770.4 | 89.0 | 91.9 | 89.1 | 85.8 | 71.9 |
| Comparative Example 5 | 922.3 | 792.7 | 85.9 | 90.2 | 87.2 | 83.2 | 70.9 |
| Comparative Example 6 | 882.4 | 775.2 | 87.5 | 88.3 | 87.1 | 82.3 | 71.4 |
| Comparative Example 7 | 893.6 | 769.9 | 86.2 | 89.9 | 87.6 | 83.5 | 71.2 |

Referring to Table 3, the coin half-cell of Example 7 was found to have an improved initial capacity compared to the initial efficiencies of the half coin-cells of Comparative Example 5 to Comparative Example 7. The coin half-cells of Examples 5 to 7 were found to have improved rate characteristics compared to those of the coin half-cells of Comparative Examples 5 to 7.

Evaluation Example 2

Evaluation of Lifetime Characteristics

Lifetime characteristics of the coin half-cells of Examples 5 to 7 and Comparative Examples 5 to 8 were evaluated as follows:

Each of the coin half-cells of Examples 5 to 7 and Comparative Examples 5 to 8 was charged at room temperature at 0.1 C to 0.01V and then discharged at a constant current of 0.1 C to a cut-off voltage of 1.5V to measure charge and discharge capacities at $1^{st}$ cycle. Next, the coin half-cell was charged at 0.5 C to 0.01V in the same manner as above and then discharged at 0.5 C to 1.0 V to measure charge and discharge capacities. This charging and discharging cycle was repeated 103 times to measure a discharge capacity at $103^{rd}$ cycle. A capacity retention rate (%) of each of the coin half-cells was calculated using Equation 1 as a measure of lifetime characteristics. The results are shown in Table 4 and FIG. 8.

Capacity retention rate (%)=[Discharge capacity at $103^{th}$ cycle/Discharge capacity at $4^{th}$ cycle]×100   Equation 1

TABLE 4

| Example | Discharge capacity at $4^{th}$ cycle (mAh/g) | Discharge capacity at $103^{rd}$ cycle (mAh/g) | Capacity retention rate (%) |
|---|---|---|---|
| Example 5 | 691.0 | 540.4 | 78.2 |
| Example 6 | 685.2 | 527.0 | 77.0 |
| Example 7 | 692.7 | 512.3 | 74.0 |
| Comparative Example 5 | 734.4 | 511.8 | 69.7 |
| Comparative Example 6 | 684.1 | 461.3 | 67.4 |
| Comparative Example 7 | 681.8 | 480.7 | 70.3 |
| Comparative Example 8 | 687.9 | 488.4 | 71.0 |

Figure 8:
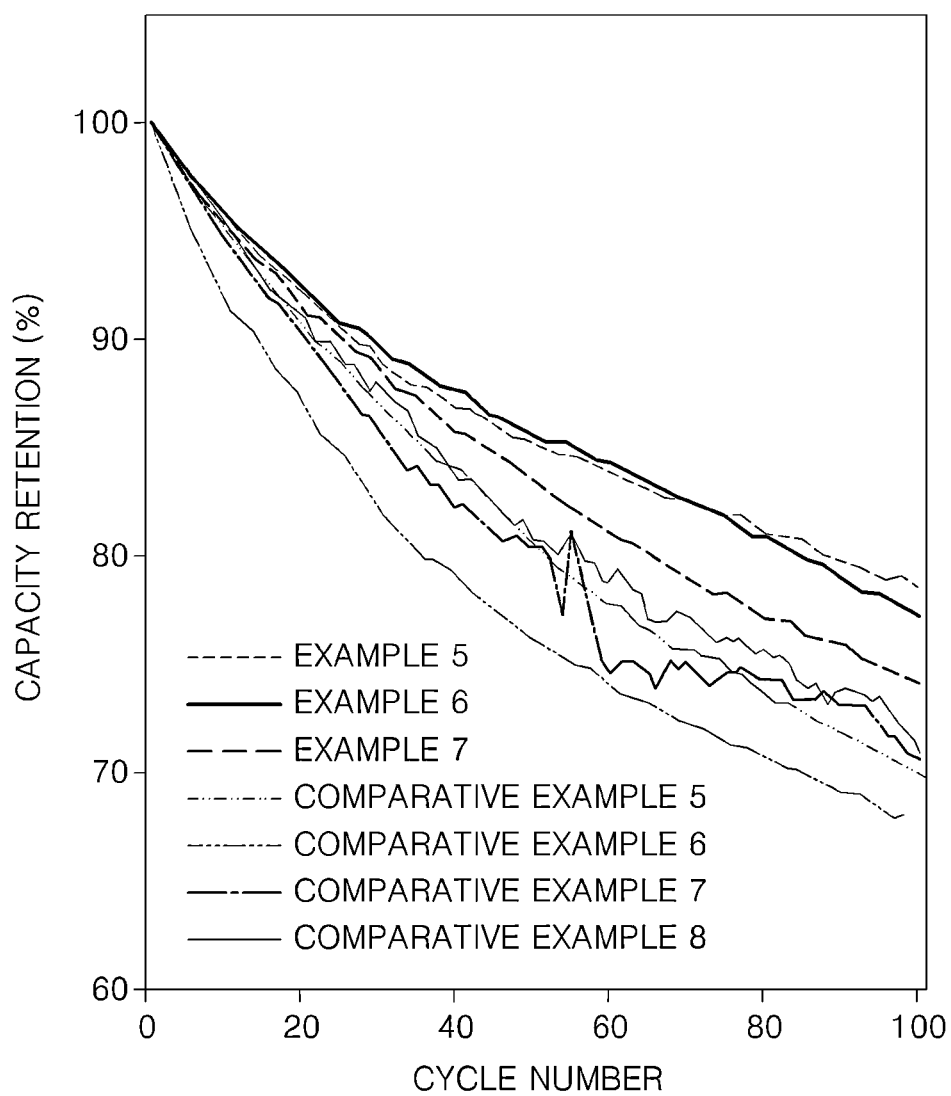
FIG. 8 is a graph of capacity retention (percent, %) versus cycle number illustrating lifetime characteristics of the lithium batteries of Examples 5 to 7 and Comparative Examples 5 to 8.

Referring to Table 4 and FIG. 8, the half coin-cells of Examples 5 to 7 were found to have improved capacity retention rates compared to those of the half coin-cells of Comparative Example 5 to 8.

As described above, according to the one or more of the above embodiments, an anode active material may include a core including a metal or a metalloid that allows intercalation and deintercalation of lithium ions, and a plurality of coating layers on a surface of the core and each including a metal oxide, an amorphous carbonaceous material, or combination thereof. A lithium battery including the anode active material may have improved charge/discharge rate characteristics and improved lifetime characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An anode active material comprising:
   a core comprising a metal or a metalloid that can incorporate and deincorporate lithium ions; and
   a plurality of coating layers on a surface of the core, each coating layer comprising a metal oxide, an amorphous carbonaceous material, or a combination thereof, and
   wherein the core comprises silicon, a silicon alloy, a composite comprising silicon and a crystalline carbonaceous material, or a combination thereof, and
   wherein a first coating layer of the plurality of coating layers comprises a metal oxide and wherein the first coating layer is disposed on a surface of the core, and
   wherein a second coating layer of the plurality of coating layers comprises an amorphous carbonaceous material and wherein the second coating layer is disposed on each of the surface of the core and on a surface of the metal oxide of the first coating layer.

2. The anode active material of claim 1, wherein the composite comprises silicon disposed on a surface of a particle of the crystalline carbonaceous material.

3. The anode active material of claim 1, wherein the silicon of the composite comprises a silicon particle, a silicon nanowire, a silicon nanorod, a silicon nanotube, a silicon nanoribbon, or a combination thereof.

4. The anode active material of claim 1, wherein the crystalline carbonaceous material of the composite comprises natural graphite, artificial graphite, or a combination thereof.

5. The anode active material of claim 1, wherein an amount of the metal or metalloid of the core is in a range of about 1 part by weight to about 50 parts by weight, based on 100 parts by weight of the anode active material.

6. The anode active material of claim 1, wherein the metal oxide comprises a metal oxide represented by Formula 1:

$$M_xO_y \qquad \text{Formula 1}$$

wherein, in Formula 1,
M is aluminum (Al), magnesium (Mg), silicon (Si), zirconium (Zr), vanadium (V), molybdenum (Mo), or a combination thereof;
0<x<5; and
0<y<20.

7. The anode active material of claim 1, wherein an amount of the metal oxide is in a range of about 0.5 parts by weight to about 2 parts by weight, based on 100 parts by weight of the anode active material.

8. The anode active material of claim 1, wherein each of the coating layers comprising the metal oxide has a thickness of about 10 nanometers or less.

9. The anode active material of claim 1, wherein the amorphous carbonaceous material comprises soft carbon, hard carbon, a meso-phase pitch carbide, a sintered cork, or a combination thereof.

10. The anode active material of claim 1, wherein an amount of the amorphous carbonaceous material is in a range of about 0.1 part by weight to less than 2 parts by weight, based on 100 parts by weight of the anode active material.

11. The anode active material of claim 1, wherein each coating layer comprising the amorphous carbonaceous material has a thickness of about 10 nanometers or less.

12. The anode active material of claim 1,
wherein the core comprises a composite comprising silicon and a crystalline carbonaceous material, wherein the silicon is disposed on a surface of a particle of the crystalline carbonaceous material.

13. The anode active material of claim 1, wherein an Al2p peak in X-ray photoelectron spectrum of the anode active material has a binding energy of about 75 electron volts or less.

14. The anode active material of claim 1, wherein the anode active material further comprises a crystalline carbonaceous material.

15. The anode active material of claim 14, wherein an amount of the crystalline carbonaceous material is in a range of about 0.1 parts by weight to about 30 parts by weight, based on 100 parts by weight of the anode active material.

16. A lithium battery comprising:
a cathode; an electrolyte; and an anode,
wherein the anode comprises the anode active material of claim 1.

17. A method of preparing an anode active material, the method comprising:
contacting a core comprising a metal or a metalloid that can incorporate and deincorporate lithium ions and a first metal oxide precursor, a first carbon precursor, or a combination thereof to prepare a first mixture;
thermally treating the first mixture in an inert atmosphere to form a first coating layer on a surface of the core, the first coating layer comprising a first metal oxide derived from the first metal oxide precursor, a first amorphous carbonaceous material derived from the first carbon precursor, or a combination thereof;
contacting the core comprising the first coating layer with a second metal oxide precursor, a second carbon precursor, or a combination thereof to form a second mixture, wherein the first metal oxide precursor and the second metal oxide precursor are the same or different and wherein the first carbon precursor and the second carbon precursor are the same or different; and
thermally treating the second mixture to form a second coating layer on the first coating layer, the second coating layer comprising a second metal oxide derived from the second metal oxide precursor, a second amorphous carbonaceous material derived from the carbon precursor, or combination thereof, wherein the first metal oxide and the second metal oxide are the same or different and wherein the first amorphous carbonaceous material and the second amorphous carbonaceous material are the same or different, to prepare the anode active material,
wherein the core comprises silicon, a silicon alloy, a composite comprising silicon and a crystalline carbonaceous material, or a combination thereof, and
wherein the first coating layer comprises a metal oxide and wherein the first coating layer is disposed on a surface of the core, and
wherein the second coating layer comprises an amorphous carbonaceous material and wherein the second coating layer is disposed on each of the surface of the core and on a surface of the metal oxide of the first coating layer.

18. The method of claim 17, wherein the first and second carbon precursors are each independently a substituted or unsubstituted $C_6$-$C_{30}$ aromatic compound or a substituted or unsubstituted $C_5$-$C_{30}$ heterocyclic compound comprising a hydroxyl group, a carboxyl group, or a combination thereof.

19. The method of claim 17, wherein the thermally treating of the first and second mixtures to form the first and second coating layers are each performed in a nitrogen or in an argon gas-including inert atmosphere.

20. The anode active material of claim 1, wherein the plurality of coating layers comprises a first coating layer and a second coating layer,
wherein the first coating layer is between the core and the second coating layer, and
wherein the first coating layer comprises the metal oxide and the second coating layer comprises the amorphous carbonaceous material.

* * * * *